July 28, 1925.
J. H. PHILLIPS
FLEXIBLE PIPE
Filed March 11, 1924
1,547,402
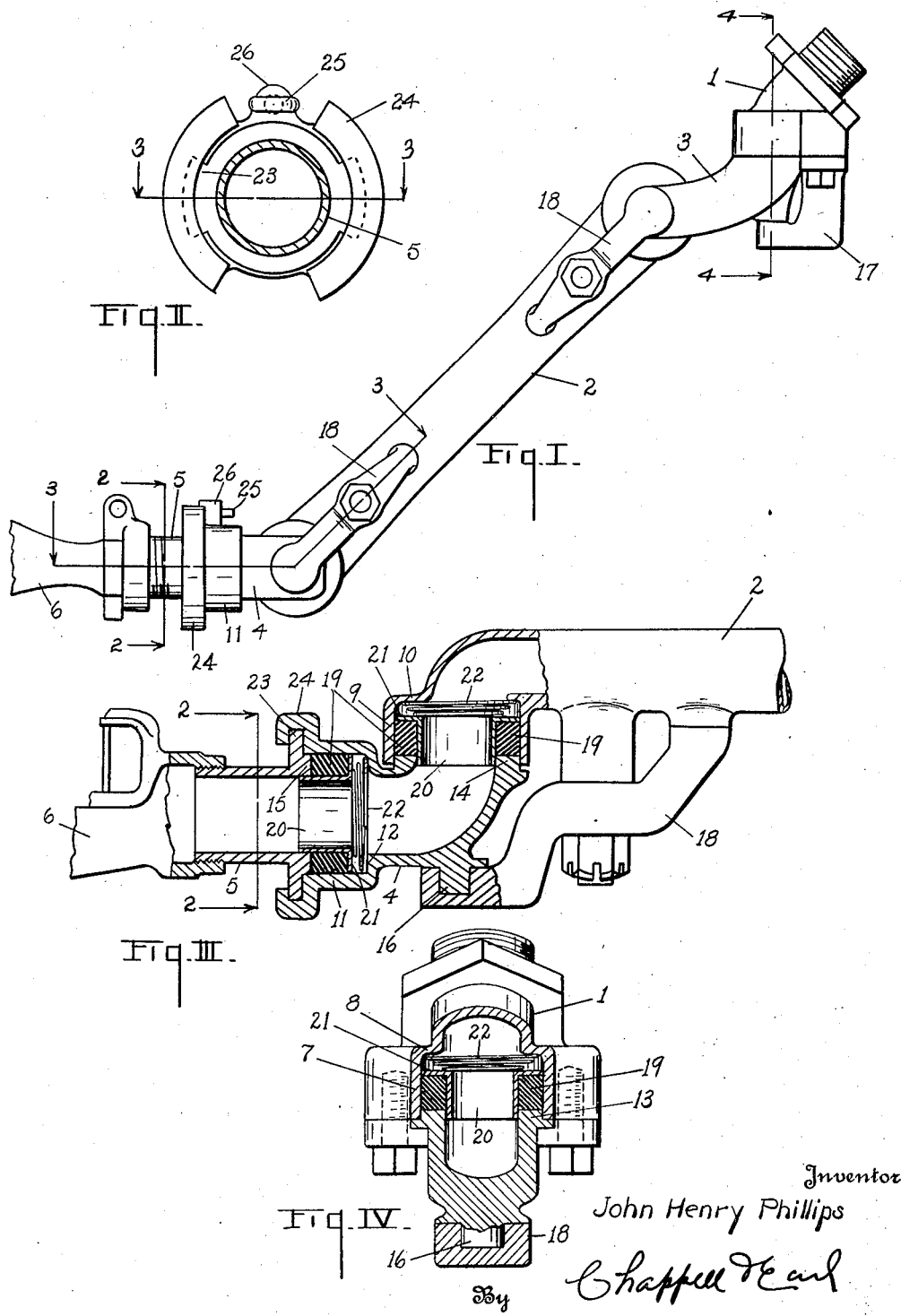

Patented July 28, 1925.

1,547,402

UNITED STATES PATENT OFFICE.

JOHN H. PHILLIPS, OF JACKSON, MICHIGAN.

FLEXIBLE PIPE.

Application filed March 11, 1924. Serial No. 698,431.

REISSUED

*To all whom it may concern:*

Be it known that I, JOHN H. PHILLIPS, a citizen of the United States, residing at the city and county of Jackson, State of Michigan, have invented certain new and useful Improvements in Flexible Pipes, of which the following is a specification.

This invention relates to improvements in flexible pipes.

My improvements are particularly designed by me as a substitute for the rubber coupling hose commonly employed on train pipes and in the accompanying drawing I have illustrated my improvements as I have embodied them for that purpose. My improvements are, however, adapted for use in other relations where pipe joints are required.

The main objects of my invention are:

First, to provide an improved flexible pipe, the joints of which are well adapted to withstand heavy pressure without leaking.

Second, to provide an improved flexible pipe which has the required flexibility to permit the ready joining or coupling of the coacting pipes, as in coupling a train.

Third, to provide an improved flexible pipe joint having these advantages which is simple and economical in structure.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a detail side view of a train pipe coupling embodying the features of my invention.

Fig. II is a transverse section on a line corresponding to line 2—2 of Figs. I and III.

Fig. III is a detail view partially in longitudinal central section on a line corresponding to line 3—3 of Figs. I and II.

Fig. IV is a detail section on a line corresponding to line 4—4 of Fig. I.

In the drawings similar reference characters refer to similar parts throughout the several views, and the sectional views are taken looking in the direction of the little arrows at the ends of the section lines.

Referring to the drawings, my improved flexible pipe comprises the supporting member 1 adapted to be mounted upon a railway car and connected to the air or steam pipe thereof, the pipe section 2, the upper joint member 3, the lower joint member 4 and the coupling member 5 which has secured thereto one of the standard types of train pipe couplings 6.

The supporting member 1 has a downwardly facing cylindrical socket 7 having a shoulder 8 at the inner end thereof. The pipe section 2 has laterally facing cylindrical sockets 9 corresponding with the shoulder 10 and its inner end corresponding to the socket and shoulders of the member 1. The member 4 has a longitudinally disposed socket 11 with a shoulder 12 at its inner end corresponding to the sockets and shoulders described. The member 3 has a vertically disposed cylindrical nipple 13 coacting with the socket 7 of the member 1 and rotatable therein and a corresponding laterally disposed nipple coacting with the rotatably disposed socket 9 of the member 2.

The member 4 has a nipple 14 rotatable within the socket 9 at the lower end of the section 2, while the coupling member 5 has a nipple 15 rotatable within the socket of the member 4. The joint members 3 and 4 have journals 16 axially aligned with the nipples, that is, journals being engaged by the members 17 and 18 carried by the members 3 and 2 respectively, so that the parts are rotatably secured together, these members 17 and 18 being detachably secured as is indicated.

Annular gaskets 19 are arranged within the sockets to engage the ends of the nipples, these gaskets being supported by the sleeves 20 which are arranged through the gaskets to extend into the nipples and are provided with outwardly projecting flanges 21 at their outer ends which are engaged by the coiled springs 22, thereby yieldingly pressing the gaskets against the nipples. These sleeves prevent the gaskets bulging or collapsing inwardly and also provide an effective means for transmitting the pressure of the springs thereto, and greatly add to the life of the gaskets.

The coupling member 5 is provided with opposed segmental lugs 23 which may be engaged with the segmental channeled flanges 24 of the member 4 by rotative movement of the parts. The disengagement of the parts is prevented by means of the cotter pin 25 disposed through the lug 26 on the coupling member 4. This permits rotative movement of the coupling 6 when the train pipes of two cars are coupled and accommodates any movement to which they may be subjected in use.

Structures embodying my improvements have sufficient flexibility or freedom of movement for use on train pipes, are easily coupled and uncoupled and are very durable. The several joints are not likely to leak. My improvements are especially designed for train pipes but are desirable for use in various relations. I have not attempted to illustrate or describe such adaptations which might be desirable as I believe the disclosure made will enable those skilled in the art to which my invention relates to embody or adapt the same as may be desired.

Having thus described my invention, what I claim as new and desire to secure by Letters Patent, is:

1. A flexible pipe joint comprising a female joint member having a cylindrical socket with a shoulder at the bottom thereof, a male joint member having a nipple rotatable within said socket, an annular gasket of resilient material arranged within said socket to engage the end of said nipple, a supporting sleeve disposed through the gasket into said nipple and having an outwardly projecting flange supporting the inner end of said gasket, and a coiled spring arranged on said shoulder to engage the inner end of said supporting sleeve.

2. A flexible pipe joint comprising a female joint member having a cylindrical socket, a male joint member having a nipple rotatable within said socket, an annular gasket of resilient material arranged within said socket to engage the end of said nipple, a supporting sleeve disposed through the gasket into said nipple and having an outwardly projecting flange supporting the inner end of said gasket, and a coiled spring arranged within said socket to engage the inner end of said supporting sleeve.

3. A flexible pipe joint comprising a female joint member having a cylindrical socket, a male joint member having a nipple rotatable within said socket, an annular gasket of resilient material arranged within said socket to engage the end of said nipple, a gasket supporting sleeve disposed through the gasket, and a coiled spring arranged within said gasket to engage the inner end of said supporting sleeve.

4. A flexible pipe joint comprising a female joint member having a cylindrical socket, a male joint member having a nipple rotatable within said socket, an annular gasket of resilient material arranged within said socket to engage the end of said nipple, a gasket supporting sleeve disposed therein, and a spring arranged within the socket to support said gasket supporting sleeve.

5. In a structure of the class described, the combination of a female joint member having a longitudinally disposed cylindrical socket and provided with segmental inwardly facing flanges and a lug disposed between said flanges, a male joint member provided with a nipple rotatable within said socket and having lugs engageable with said channeled flanges by a rotative movement, and a pin disposed through said lug to project into the path of said lugs on said male joint member to prevent disengagement of the joint members.

6. In a structure of the class described, the combination with a supporting member and a pipe section, said supporting member having a downwardly facing cylindrical socket at its outer end and said pipe section having laterally facing cylindrical sockets at the ends thereof, upper and lower joint members having laterally projecting nipples rotatable within the sockets of said pipe sections, the upper joint member having an upwardly projecting nipple rotatable within the socket of said supporting member, said joint members having supporting journals axially aligned with their said nipples, the lower joint member having a longitudinally disposed cylindrical socket at its outer end and inwardly facing opposed segmental channeled flanges, retaining members mounted upon said supporting member and pipe section to engage the said journals of said joint members whereby the parts are rotatably connected, a coupling member having a nipple rotatable within the socket at the outer end of said lower joint member, said coupling member having segmental lugs engageable with its said channeled flanges, and gaskets disposed within said several sockets to engage the ends of their coacting nipples.

7. In a structure of the class described, the combination with a supporting member and a pipe section, said supporting member having a downwardly facing cylindrical socket at its outer end and said pipe section having laterally facing cylindrical sockets at the ends thereof upper and lower joint members having laterally projecting nipples rotatable within the sockets of said pipe sections, the upper joint member having an upwardly projecting nipple rotatable within the socket of said supporting member, said joint members having supporting journals axially aligned with their said nipples, retaining members mounted upon said supporting member and pipe section to engage the said journals of said joint members whereby the parts are rotatably connected, and gaskets disposed within said several sockets to engage the ends of their coacting nipples.

8. In a structure of the class described, the combination with a supporting member and a pipe section, said supporting member having a downwardly facing cylindrical socket at its outer end and said pipe section having laterally facing cylindrical sockets at the ends thereof, upper and lower joint members having laterally projecting nipples rotatable within the sockets of said pipe sections, the upper joint member having an upwardly projecting nipple rotatable within the socket of said supporting member, the lower joint member having a longitudinally disposed cylindrical socket at its outer end, a coupling member having a nipple rotatable within the socket at the outer end of said lower joint member, means for securing said members together permitting rotative movement thereof, and gaskets disposed within said several sockets to engage the ends of their coacting nipples.

9. In a structure of the class described, the combination with a supporting member and a pipe section, said supporting member having a downwardly facing cylindrical socket at its outer end and said pipe section having laterally facing cylindrical sockets at the ends thereof, upper and lower joint members having laterally projecting nipples rotatable within the sockets of said pipe sections, the upper joint member having an upwardly projecting nipple rotatable within the socket of said supporting member, the lower joint member having a longitudinally disposed cylindrical socket at its outer end, and gaskets disposed within said several sockets to engage the ends of their coacting nipples.

10. In a structure of the class described, the combination of a supporting member and a pipe section, upper and lower joint members, said supporting member and upper joint member having coacting socket and nipple relatively rotatable one within the other on a vertical axis, said pipe section and said upper and lower joint members having laterally disposed coacting sockets and nipples relatively rotatable one within the other on horizontal axes, said joint members being provided with journals axially aligned with said sockets and nipples, retaining members mounted on said supporting member and pipe section to engage said journals on said joint members whereby the parts are rotatably connected, a coupling member, the lower joint member and said coupling member having longitudinally disposed rotatably associated coacting socket and nipple, and gaskets disposed within the several sockets to coact with their coacting nipples.

11. In a structure of the class described, the combination of a supporting member and a pipe section, upper and lower joint members, said supporting member and upper joint member having vertically disposed coacting socket and nipple, said pipe section and upper and lower joint members having laterally disposed coacting sockets and nipples, said sockets and nipples being rotatably associated, said joint members being provided with journals axially aligned with said sockets and nipples, retaining members mounted on said supporting member and pipe sections to engage said journals in said joint members whereby the parts are rotatably connected, and gaskets disposed within the several sockets to coact with their coacting nipples.

In witness whereof, I have hereunto set my hand.

JOHN H. PHILLIPS. [L. S.]